(12) United States Patent
Nagai et al.

(10) Patent No.: US 7,562,594 B2
(45) Date of Patent: Jul. 21, 2009

(54) ELECTRIC ACTUATOR CAPABLE OF CONVERTING ROTATIONAL MOTION TO A LINEAR MOTION

(75) Inventors: Shigekazu Nagai, Ibaraki (JP); Akio Saitoh, Ibaraki (JP); Toru Sugiyama, Ibaraki (JP); Masaki Miyahara, Ibaraki (JP)

(73) Assignee: SMC Corporation, Chiyoda-ku, Tokyo (JP)

( * ) Notice: Subject to any disclaimer, the term of this patent is extended or adjusted under 35 U.S.C. 154(b) by 585 days.

(21) Appl. No.: 11/203,702

(22) Filed: Aug. 15, 2005

(65) Prior Publication Data

US 2006/0081078 A1    Apr. 20, 2006

(30) Foreign Application Priority Data

Aug. 30, 2004    (JP) .............................. 2004-250858

(51) Int. Cl.
*F16H 27/02* (2006.01)
*F16H 29/02* (2006.01)
*F16H 3/06* (2006.01)

(52) U.S. Cl. .................... 74/89.23; 74/89.36; 74/89.37; 188/129; 188/130; 188/134

(58) Field of Classification Search ................. 188/129, 188/130, 134; 74/89.36, 89.23, 89.37
See application file for complete search history.

(56) References Cited

U.S. PATENT DOCUMENTS

| | | | | |
|---|---|---|---|---|
| 5,147,118 | A * | 9/1992 | Reuter et al. ............. | 303/115.2 |
| 5,219,047 | A * | 6/1993 | Fouilleux et al. ........... | 188/71.9 |
| 6,612,253 | B1 * | 9/2003 | Kuhlman .................... | 114/249 |
| 6,807,877 | B2 * | 10/2004 | Sato et al. .................. | 74/89.37 |

FOREIGN PATENT DOCUMENTS

| | | |
|---|---|---|
| JP | 11-030234 | 2/1999 |
| JP | 11-034234 | 2/1999 |

* cited by examiner

*Primary Examiner*—Thu Nguyen
*Assistant Examiner*—Timothy J Murphy
(74) *Attorney, Agent, or Firm*—Yokoi & Co., U.S.A., Inc.; Peter Ganjian

(57) ABSTRACT

Disclosed is an electric actuator capable of effectively absorbing shock exerted on its component part. The electric actuator has a housing, a rod cover, a piston, a feed screw, a sliding nut, two piston dampers for absorbing shock exerted on the piston, a first end damper attached to one of the opposite ends of the housing, a second end damper attached to the rod cover. The sliding nut is axially displaceable relative to the piston when the piston damper absorbs shock.

3 Claims, 12 Drawing Sheets

US 7,562,594 B2

ELECTRIC ACTUATOR CAPABLE OF CONVERTING ROTATIONAL MOTION TO A LINEAR MOTION

BACKGROUND OF THE INVENTION

1. Field of the Invention

The present invention relates to an electric actuator capable of converting a rotating motion of a rotative driver to a linear motion for linearly reciprocating a moving member.

2. Description of the Related Art

Carrying means, such as an actuator, is used for carrying a workpiece.

FIGS. 12 and 13 show, by way of example, a prior art electric actuator disclosed in JP-A No. 11-30234.

Referring to FIGS. 12 and 13, an electric actuator 1 has a frame 2 provided with a guide groove 3, a slider 4 that moves in the guide groove 3, a nut 5 detachably attached to the slider 4 and a threaded rod 6 linked to the nut 5. Opposite end parts of the threaded rod 6 are supported on threaded rod support members 7a and 7b, respectively. The threaded rod support members 7a and 7b are placed on the upper surface 8 of the frame 2 and are fastened to the frame 2.

When the electric actuator 1 is operated, similarly to the hydraulic cylinder actuator, without using any complicated controller or the like to press the slider 4 against a workpiece disposed at an intermediate position between the opposite ends of the stroke of the slider 4, shock that acts on the slider 4 upon the contact of the slider 4 with the workpiece is transmitted to the threaded rod 6 and the associated parts, adversely affecting the durability of the electric actuator 1.

SUMMARY OF THE INVENTION

The present invention has been made in view of the foregoing problem and it is therefore an object of the present invention to provide an electric actuator capable of properly absorbing shock that acts on its moving member when the moving member is brought into contact with a work piece to press the workpiece to avoid the adverse effect of the shock on its durability.

An electric actuator according to a preferred aspect of the present invention includes: a housing; a rotative driver connected to the housing; a moving unit; a motion-converting mechanism for converting the rotating motion of the rotative driver into a linear motion of the moving unit, including a transmission shaft for transmitting the rotative driving force of the rotative driver to the moving unit; and a damping mechanism for absorbing the shock on the moving unit; wherein the moving unit includes a piston and a sliding nut fitted in an axial bore formed in the piston, linked with the transmission shaft and driven by the transmission shaft for movement together with the piston, and the damping mechanism includes piston dampers for absorbing shock on the piston, made of elastic materials and attached to the opposite axial ends, respectively, of the sliding nut, and the piston and the sliding nut are movable relative to each other in directions parallel to the axis of the transmission shaft when each of the piston dampers absorbs the shock.

Preferably, the damping mechanism includes, in addition to the piston dampers, a first end damper made of an elastic material and attached to one end, on the side of the piston, of the housing, and a second end damper made of an elastic material and attached to a rod cover at a predetermined distance from the housing.

A damping function is exercised by the synergistic effect of the piston damper and the first end damper at one of the opposite ends of the stroke of the piston, and a damping function is exercised by a synergistic effect of the piston damper and the second end damper at the other end of the stroke of the piston.

Parts of a predetermined length of the two piston dampers project from the end surfaces, respectively, of the sliding nut, one of the piston dampers is in contact with a connecting member, and the other piston dampers are in contact with an annular member. Shock exerted on the piston is transmitted through the connecting member or the annular member to and absorbed by the piston damper.

In an ordinary state where no shock is exerted on the piston, the connector connected to one of the opposite ends of the piston and the annular member connected to the other end of the piston hold the sliding nut, and piston moves together with the sliding nut when the sliding nut is driven for movement by the transmission shaft.

When the piston is brought into contact with a workpiece at a position, such as an intermediate position between the opposite ends of the stroke of the piston or at an end position corresponding to one of the ends of the stroke, and shock is exerted on the piston, the piston damper absorbs the shock.

Since the sliding nut held in the piston can slightly axially move along the axis of the transmission shaft when the piston damper absorbs the shock, the piston damper can properly absorb the shock.

The shock can be more effectively absorbed at the end of the stroke of the piston by the synergistic effect of the piston damper and the first or the second end damper.

The present invention has the following effects. When the electric actuator is used for pressing a workpiece, the shock on the moving unit when the moving unit is brought into contact with the workpiece can be effectively absorbed by the damping mechanism including the piston dampers and such to avoid the adverse effect of the shock on the durability of the electric actuator.

DESCRIPTION OF THE PREFERRED EMBODIMENTS

Electric actuators in preferred embodiments according to the present invention will be described with reference to the accompanying drawings.

Figure 1:
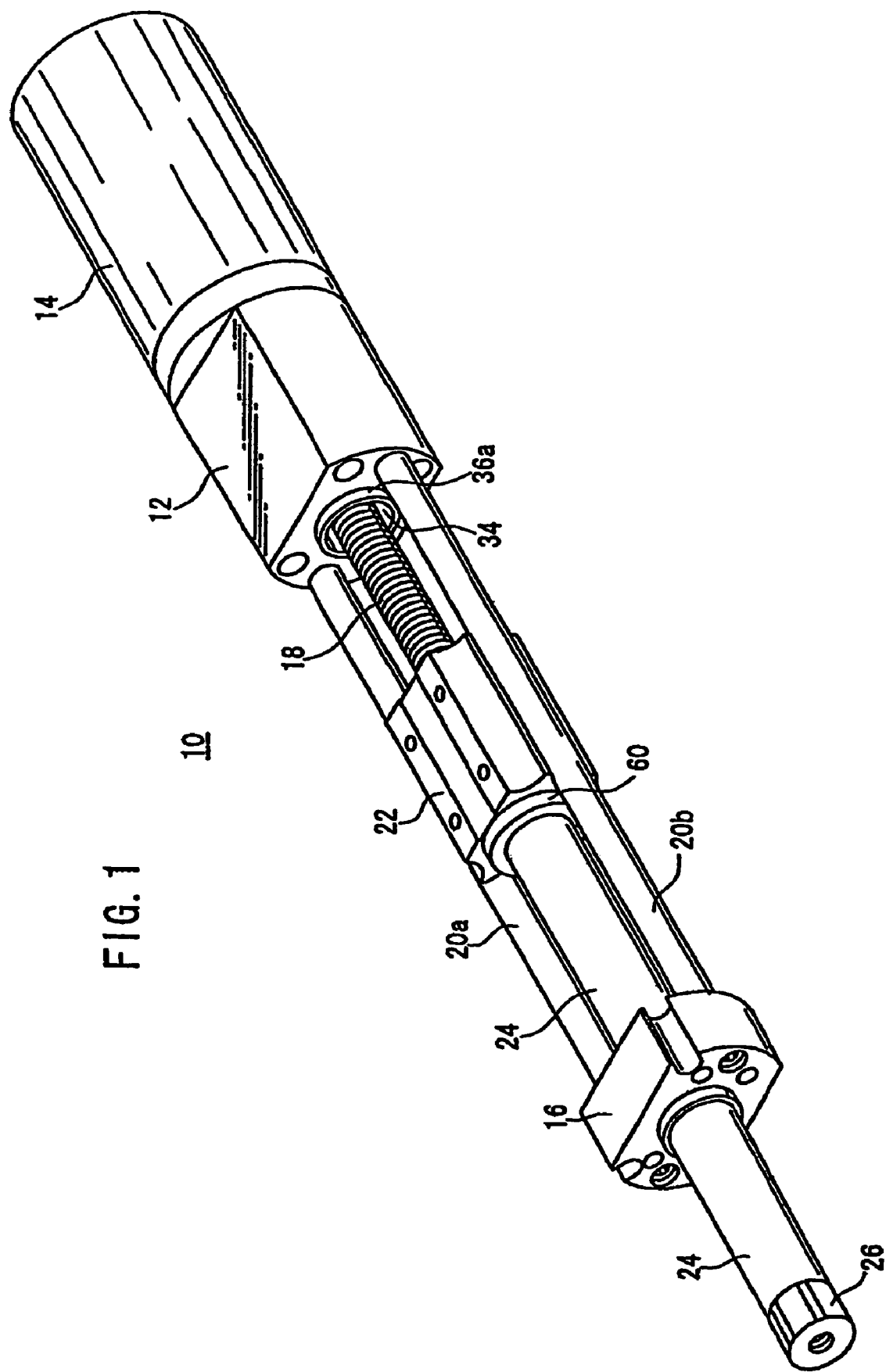
FIG. 1 is a perspective view of an electric actuator in a first embodiment according to the present invention.

Referring to FIG. 1, an electric actuator 10 in a first embodiment according to the present invention has a housing 12 of a shape substantially resembling a flat block, a rotative driver 14 connected to the back end of the housing 12, a rod cover 16, namely, an end block, disposed at a predetermined distance from the front end of the housing 12, and a feed screw 18, namely, a transmission shaft, to be driven for rotation by the rotative driver 14. The feed screw 18 is coupled to the output haft of the rotative driver 14 by a coupling 28.

The electric actuator 10 has also a pair of guide rods 20a and 20b extended on the opposite sides of the feed screw 18, a piston 22 linked to the feed screw 18 and guided for movement by the guide rods 20a and 20b, a tubular piston rod 24 extended through the rod cover 16 and supported for movement together with the piston 22, and a socket (plug) 26 plugged into the front end of the tubular piston rod 24. The guide rod 20a has opposite ends fastened to the housing 12 and the rod cover 16 with a first screw 19a and a second screw 21a, and the guide rod 20b has opposite ends fastened to the housing 12 and the rod cover 16 with a first screw 19b and a second screw 21b, respectively.

The piston 22 and the piston rod 24 are moving members. Preferably, the feed screw 18 is processed by a surface treatment, such as an electroless nickel plating process. The coupling 28 may be omitted and the threaded output shaft of the rotative driver 14 may be used also as the feed screw 18.

Figure 2:
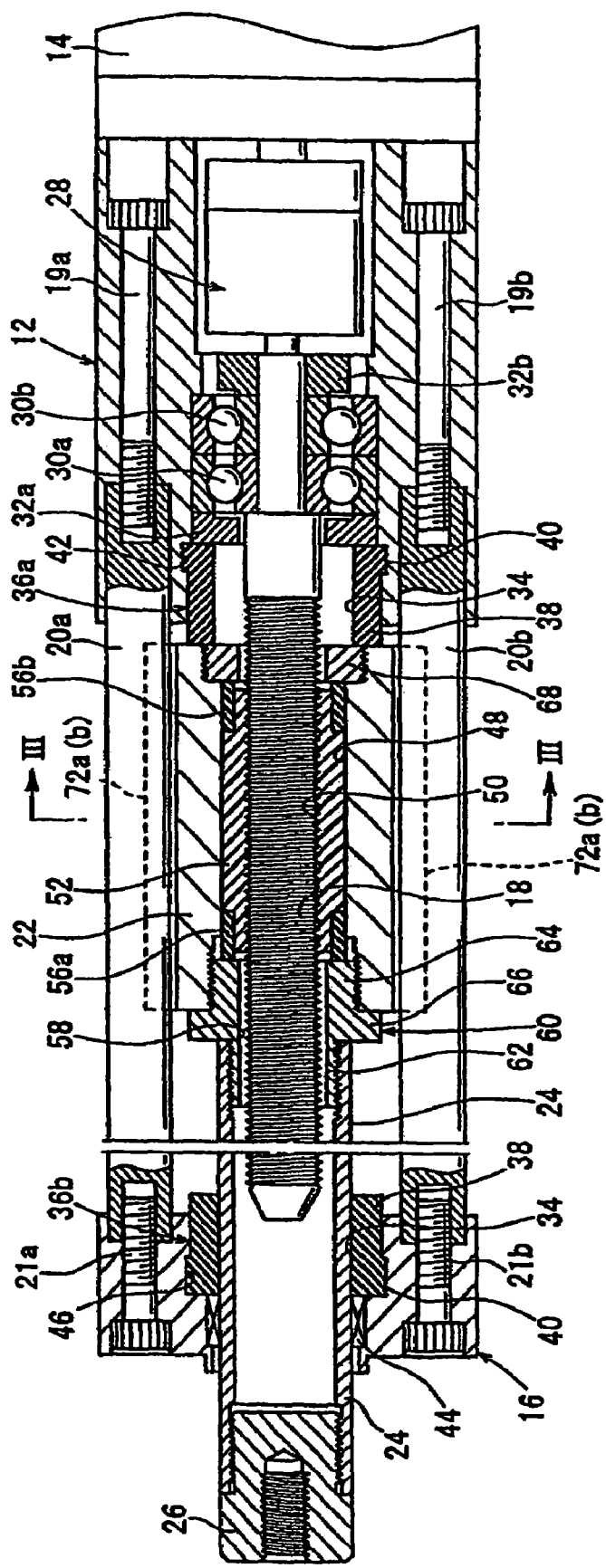
FIG. 2 is a fragmentary, longitudinal sectional view of the electric actuator shown in FIG. 1.

Referring to FIG. 2, a first bearing 30a and a second bearing 30b are disposed contiguously near the coupling 28 in the housing 12 on the side of the feed screw 18. The first bearing 30a and the second bearing 30b are held between a first bearing holder 32a and a second bearing holder 32b.

Figure 4:
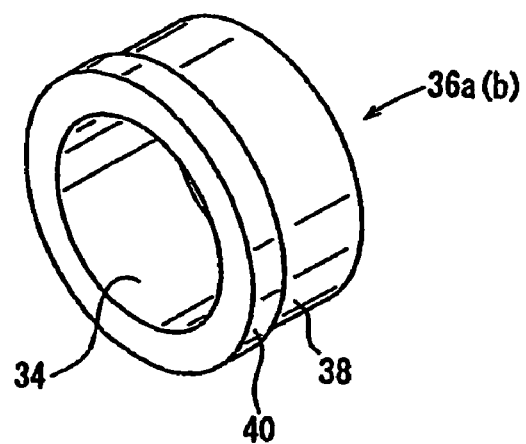
FIG. 4 is a perspective view of an end damper.

A first end damper 361 provided with a through hole 34 is held in a front end part, on the side of the piston 22, of the housing 12. The feed screw 18 is extended through the through hole 34 of the first end damper 36a. As shown in FIG. 4, the first end damper 36a has a cylindrical part 38 having a predetermined wall thickness, and a flange 40 having an outside diameter slightly greater than that of the cylindrical part 38. The cylindrical part 38 and the flange 40 are formed integrally in a single body.

The first end damper 36a is held in the housing 12 with the flange 40 thereof fitted in an annular groove 42 formed in the housing 12 such that a front end part of a predetermined length of the cylindrical part 38 projects toward the piston 22 from the front end surface of the housing 12.

The piston rod 24 extends through the rod cover 16. A second end damper 36b and a bushing 44 are fitted in the central bore of the rod cover 16. The second end damper 36b is the same in shape as the first end damper 36a, and has a cylindrical part 38 and a flange 40. The flange 40 of the second end damper 36b is fitted in an annular groove 46 formed in the rod cover 16 such that a back end part of a predetermined length of the cylindrical part 38 projects toward the piston 22 from the back end surface of the rod cover 16.

The first end damper 36a and the second end damper 36b are made of an elastic material, such as urethane rubber.

Figure 3:
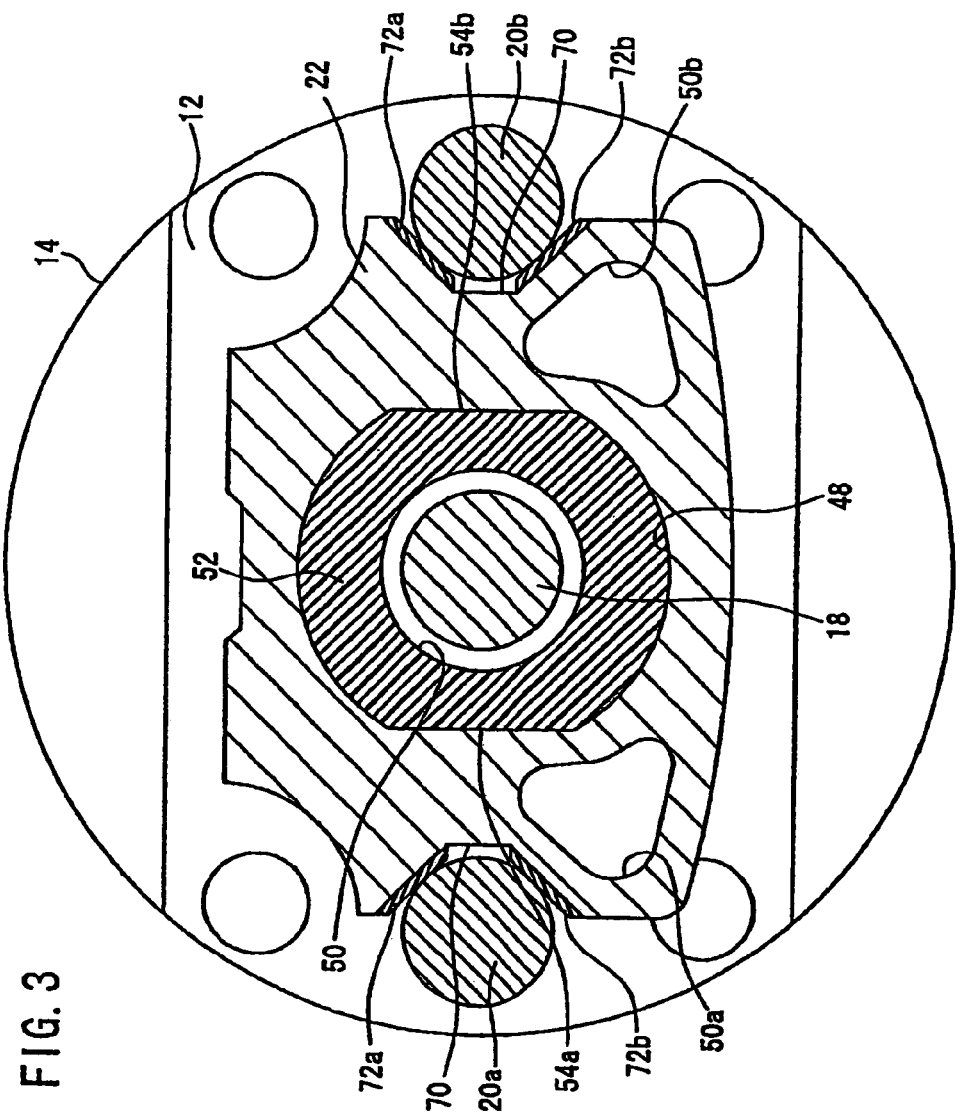
FIG. 3 is a cross-sectional view taken on the line III-III in FIG. 2.

As shown in FIG. 3, the piston 22 is provided with a through hole 48 having a substantially elliptic sectional shape and two thinning holes 50a and 50b formed on the opposite sides, respectively, of the through hole 48. The piston 22 is made of a metal, such as aluminum. A substantially cylindrical sliding nut 58 is axially slidably inserted in the through hole 48 of the piston 22. The sliding nut 58 is provided with a threaded hole 50. The feed screw 18 is engaged in the threaded hole 50 of the sliding nut 58.

The sliding nut 52 and the piston 22 are movable relative to each other in directions parallel to the axis of the feed screw 18. Opposite flats 54a and 54b are formed in the sliding nut 52 by cutting parts of the circumference of the sliding nut 52. The flats 54a and 54b restrains the sliding nut 52 from turning relative to the piston 22.

Figure 5:
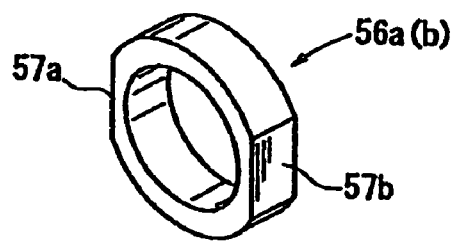
FIG. 5 is a perspective view of a piston damper.

Two annular piston dampers 56a and 56b shown in FIG. 5 are fitted in annular recesses formed in the opposite ends of the sliding nut 52, respectively, such that end parts of a predetermined length of the piston dampers 56a and 56b project axially from the opposite ends surfaces of the sliding nut 22, respectively.

Each of the piston dampers 56a and 56b is provided with opposite flats 57a and 57b in the circumference thereof. The respective profiles of the piston dampers 56a and 56b are analogous to that of the sliding piston 22 as shown in FIG. 3.

A connecting member 60 is attached to one of the axial ends, namely, the front end, of the piston 22. The connecting member 60 has a first tubular part 62 provided with an external thread, a second tubular part 64 provided with an external thread, and a flange 66 formed between the first tubular part 62 and the second tubular part 64. The first tubular part 62 is screwed into an internally threaded back part of the piston rod 24. The second tubular part 64 is screwed into an internally threaded front part of the piston 22. The first tubular part 62, the second tubular part 64 and the flange 66 are formed integrally in a single body.

A ring 68 provided with an external thread is screwed into an internally threaded back part of the piston 22 so that the back end surface of the ring 68 is flush with the back end surface of the piston 22.

The piston damper 56a having the part of the predetermined length projecting from the front end surface of the sliding nut 52 is in contact with the second tubular part 64 of the connecting member 60. The piston damper 56b having the part of the predetermined length projecting from the back end surface of the sliding nut 52 is in contact with the ring 68.

The sliding nut 52 is held inside the piston 22 by the connecting member 60 and the ring 68 attached to the opposite ends, respectively, of the piston 22, except in a state where the piston rod 24 is brought into contact with a workpiece W and shock is exerted on the piston rod 24. The sliding nut 52 is moved axially together with the piston 22 by rotating the feed screw 18.

The piston dampers 56a and 56b, similarly to the first end damper 36a and the second end damper 36b, may be made of an elastic material, such as urethane rubber.

Longitudinal grooves 70 having a sectional shape substantially resembling a circular arc (actually, V-shaped groove) are formed in the opposite side surfaces, respectively, of the piston 22 as shown in FIG. 3. The guide rods 20a and 20b engages in the grooves 70 to support the piston 22 between the guide rods 20a and 20b. Slide plates 72a and 72b made of a resin are extended longitudinally on and adhesively attached to the side surfaces of each longitudinal groove 70. The guide rods 20a and 20b are in line contact with the slide plates 72a and 72b. The slide plates 72a and 72b reduces frictional resistance against the sliding movement of the piston 22 along the guide rods 20a and 20b.

When a radial load is put on the piston 22 the guide rods 20a and 20b bears the radial load. When a torque is exerted on the piston 22, the guide rods 20a and 20b restrains the piston 22 from turning.

The electric actuator 10 in the first embodiment has the foregoing basic construction. The operation and function of the electric actuator 10 will be described.

The electric actuator 10 is connected to a power source, not shown, to actuate the rotative driver 14. The rotative driving force of the rotative driver 14 is transmitted through the coupling 28 to the feed screw 18 to rotate the feed screw in a predetermined direction. Consequently, the sliding nut 52 linked to the feed screw 18 and combined with the piston 22 is moved axially. Thus the piston 22 moves axially along the guide rods 20a and 20b together with the piston rod 24.

The moving direction of the piston 22 and the piston rod 24 can be reversed by reversing the polarity of the current supplied to the rotative driver 14.

Figure 6:
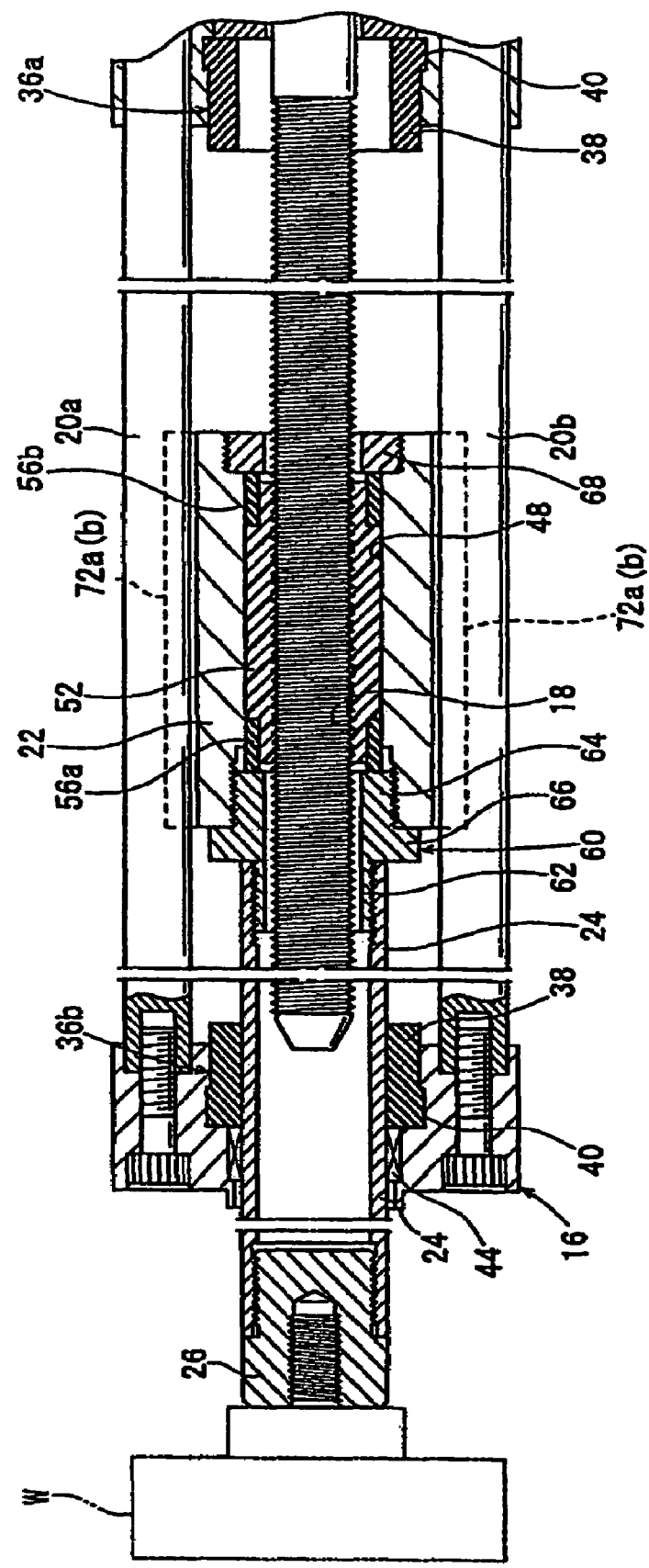
FIG. 6 is a fragmentary longitudinal sectional view of the electric actuator shown in FIG. 1, in which a piston rod at an intermediate position is in contact with a workpiece.

When the piston 22 is at a middle position between the opposite ends of the stroke thereof and the socket 26 plugged into the front end of the tubular piston rod 24 is pressed against the work W as shown in FIG. 6, shock is transmitted through the socket 26, the piston rod 24 and the connecting member 60 to the piston 22.

Figure 7:
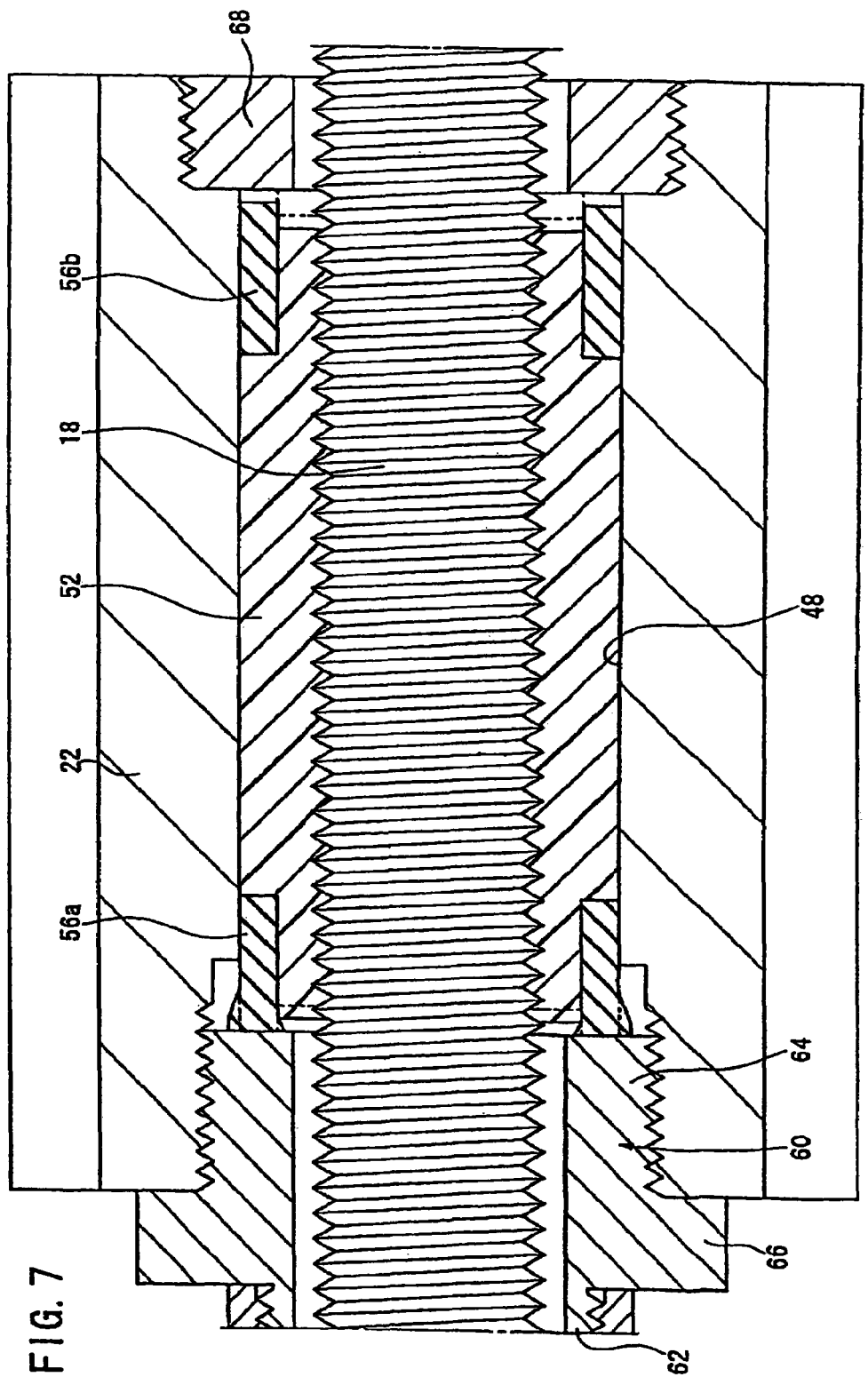
FIG. 7 is a longitudinal sectional view of assistance in explaining the damping effect of the piston damper in the state shown in FIG. 6.

Under this condition, the front end part of the piston damper 56a in contact with the connecting member 60 deforms to absorb the shock and the sliding nut 52 shifts slightly in a direction parallel to the axis of the feed screw 18 relative to the piston 22 as indicated by two-dot chain lines in FIG. 7 to absorb the shock.

In other words, the piston 22 and the connecting member 60 attached to the piston 22 can be moved along the axis of the feed screw 18 by the shock exerted on the piston rod 24, and the slight displacement of the piston 22 and the connecting member 60 is cushioned by the elastic piston damper 56a attached to the front end of the sliding nut 52 to alleviate the effects of the shock.

Since the sliding nut 52 is screwed on the feed screw 18, the sliding nut 52 does not move axially relative to the feed screw 18, and the shock is not transmitted to the internal thread of the sliding nut 52 and the external thread of the feed screw 18 engaged with the internal thread of the sliding nut 52. Thus the internal thread of the sliding nut 52 and the external thread of the feed screw 18 can be protected.

Thus the shock exerted on the piston rod 24 can be effectively absorbed by the elastic deformation of the piston damper 56a and the sliding displacement of the sliding nut 52 relative to the piston 22 even in a state where the piston 22 is at a middle position between the opposite ends of the stroke thereof and the socket 26 plugged into the front end of the tubular piston rod 24 is pressed against the work W. Consequently, the deterioration f the durability of the electric actuator 10 can be avoided.

Figure 8:
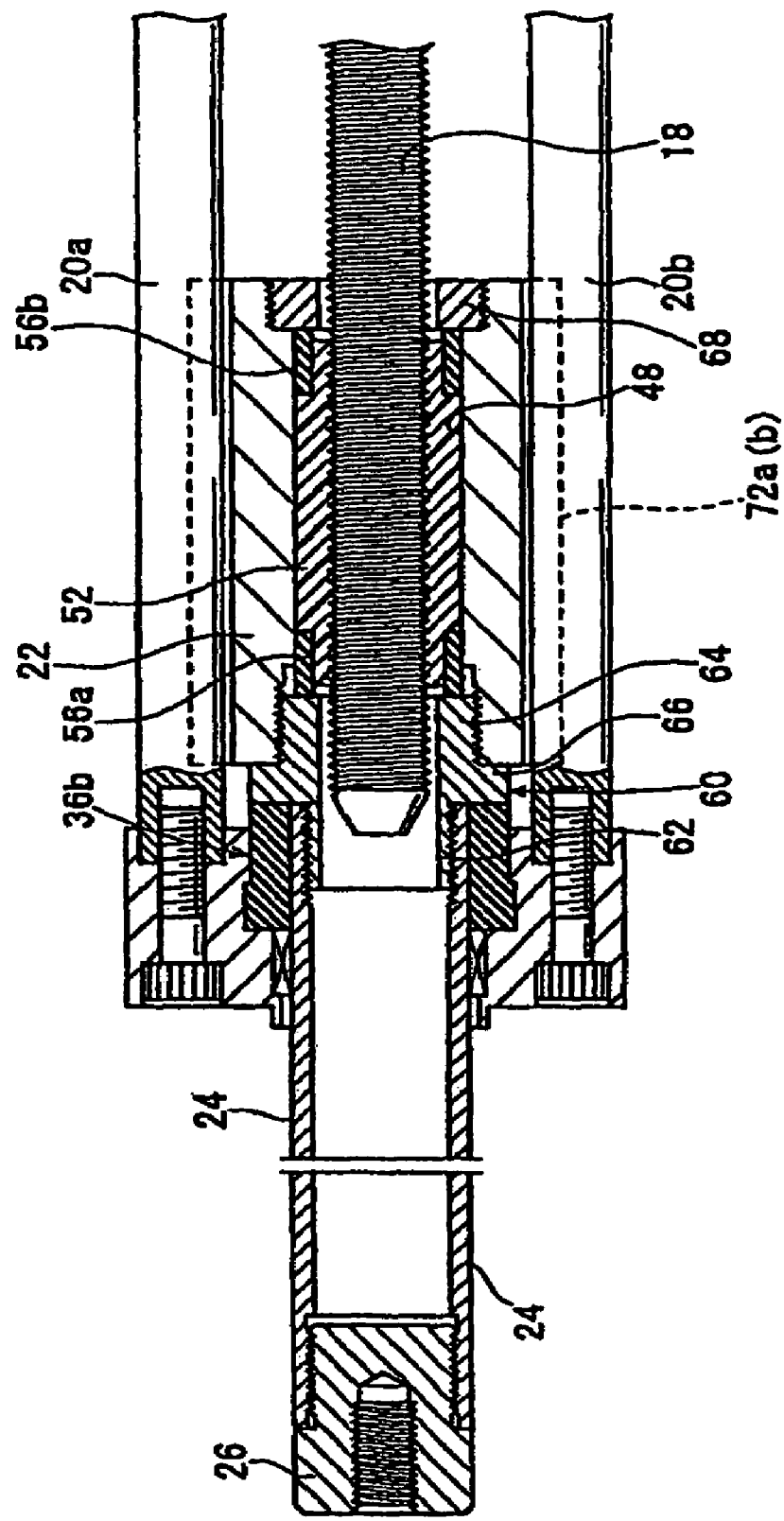
FIG. 8 is a fragmentary longitudinal sectional view of assistance in explaining the combined damping effect of the piston damper and the end damper in a state where the piston rod is at a front end position.
Figure 9:
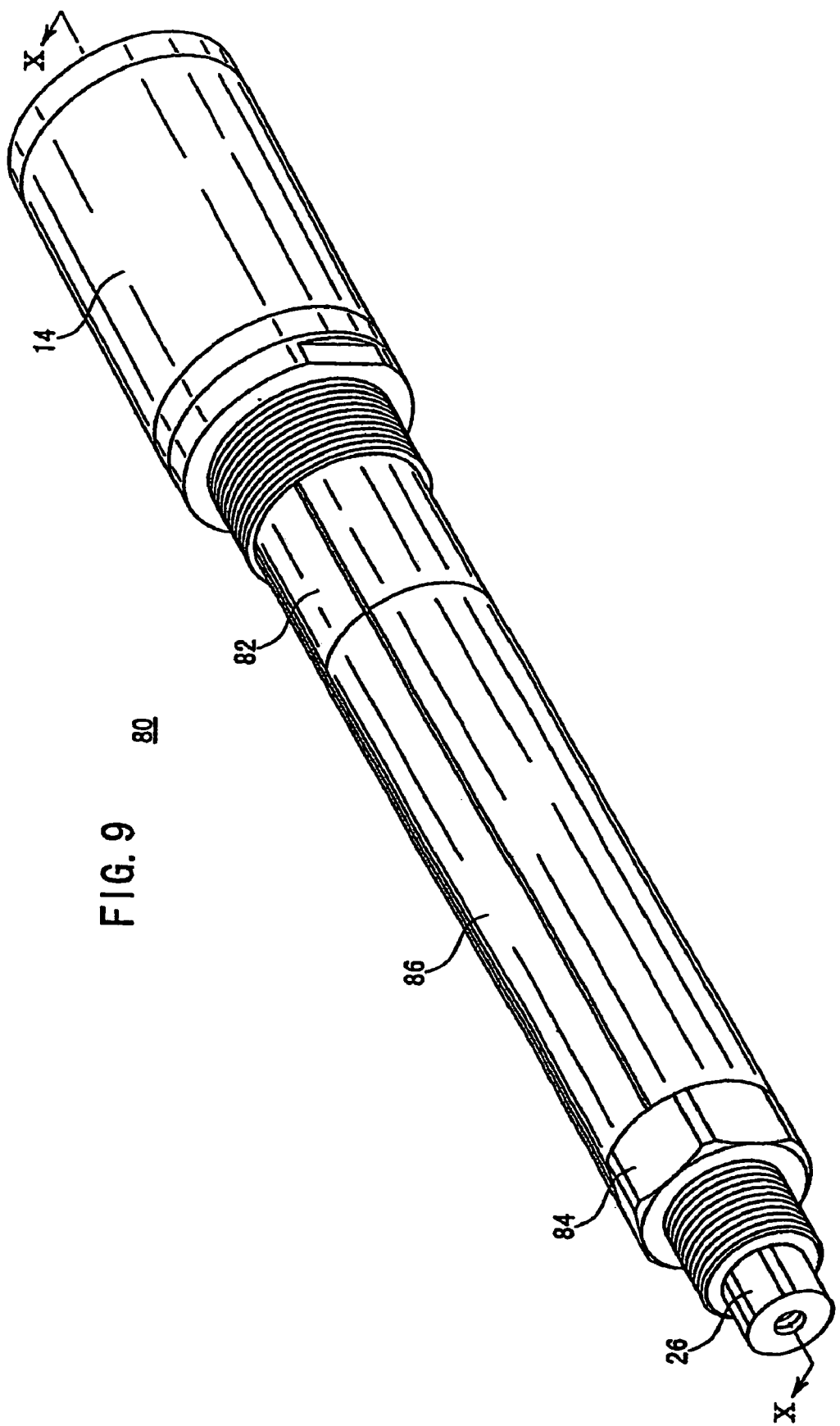
FIG. 9 is a perspective view of an electric actuator in a second embodiment according to the present invention.
Figure 10:
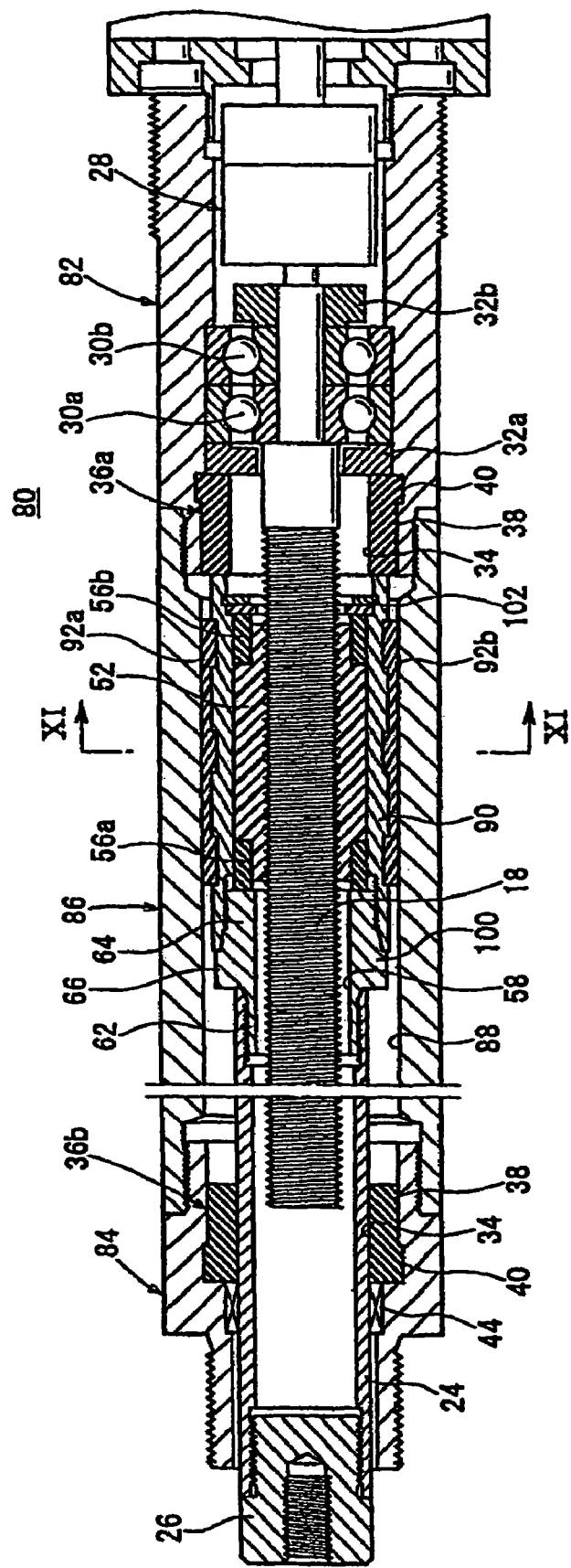
FIG. 10 in a fragmentary longitudinal sectional view taken on the line X-X in FIG. 9.

When shock is exerted on the piston rod 24 at the front end of the stroke of the piston rod 24, the shock can be more effectively absorbed by the synergistic effect of the damping effect of the piston damper 56a and that of second end damper 36b with which the flange 66 of the connecting member 60 comes into contact as shown in FIG. 8.

Similarly, when shock is exerted on the piston rod 24 at the back end of the stroke of the piston rod 24, the shock can be more effectively absorbed by the synergistic effect of the damping effect of the piston damper 56b and that of the first end damper 36a with which the end surfaces of the piston 22 and the ring 68 come into contact as shown in FIG. 2.

In the electric actuator 10 in the first embodiment, the damping mechanism including the piston dampers 56a and 56b attached to the sliding nut 52 of the piston 22, the first end damper 36a attached to the housing 12 and the second end damper 36b attached to the rod cover 16 absorbs effectively the shock exerted on the piston 22 when the piston 22 is at the front end of its stroke, at the back end of its stroke or at any position between the front and the back end of its stroke.

The electrically driven electric actuator 10 in the first embodiment can be used in an environment in which compressed air is unavailable or should not be used instead of the pneumatic cylinder actuator.

The electric actuator 10 is similar to the pneumatic cylinder actuator in that the electric actuator 10 is driven in an on-off control mode, does not need any controller, can use the piston 22 for pressing operation, can be driven without using any sensors, and speed and thrust can be controlled.

The electric actuator 10 in the first embodiment employs the two guide rods 20a and 20b instead of a rigid boy for securing a necessary rigidity. Consequently, the electric actuator 10 has a small number of component parts, can be manufactured at a low manufacturing cost and can be formed in lightweight construction.

The housing 12 and the rod cover 16 may be manufactured by die-casting aluminum, deep-drawing a sheet or forming a laminated steel sheet formed by laminating a plurality of steel sheets.

The rotative driver 14 may be, for example, a dc brush motor, a dc brushless motor, a stepping motor or an ac servomotor.

The feed screw 18 may be a sliding screw made of a resin, a sliding screw made of a metal or a ball screw. A timing belt extended between pulleys may be used instead of the feed screw 18.

An electric actuator 80 in a second embodiment according to the present invention will be described with reference to FIGS. 8 to 11, in which parts like or corresponding to those of the electric actuator 10 shown in FIG. 1 are denoted by the same reference characters and the description thereof will be omitted.

The electric actuator 80 in the second embodiment does not have any member corresponding to the guide rods 20a and 20b. The electric actuator 80 has a long cylindrical tube 86, a cylindrical housing 82 connected to the back end of the cylindrical tube 86, and a stepped cylindrical rod cover 84 connected to the front end of the cylindrical tube 86. A piston 90 is placed in the bore 88 of the tube 86.

Figure 11:
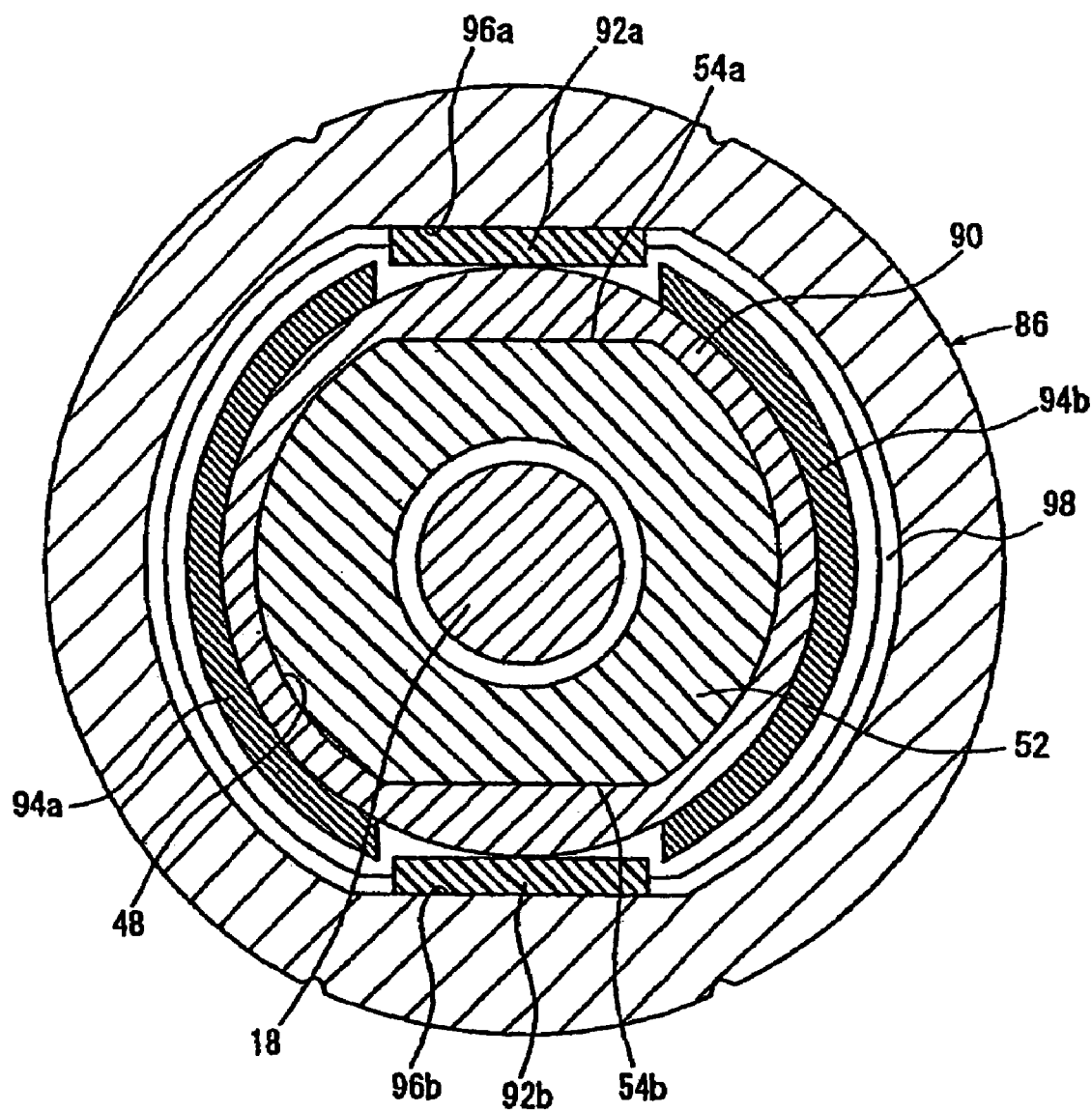
FIG. 11 is a cross-sectional view taken on the line XI-XI in FIG. 10.
Figure 12:
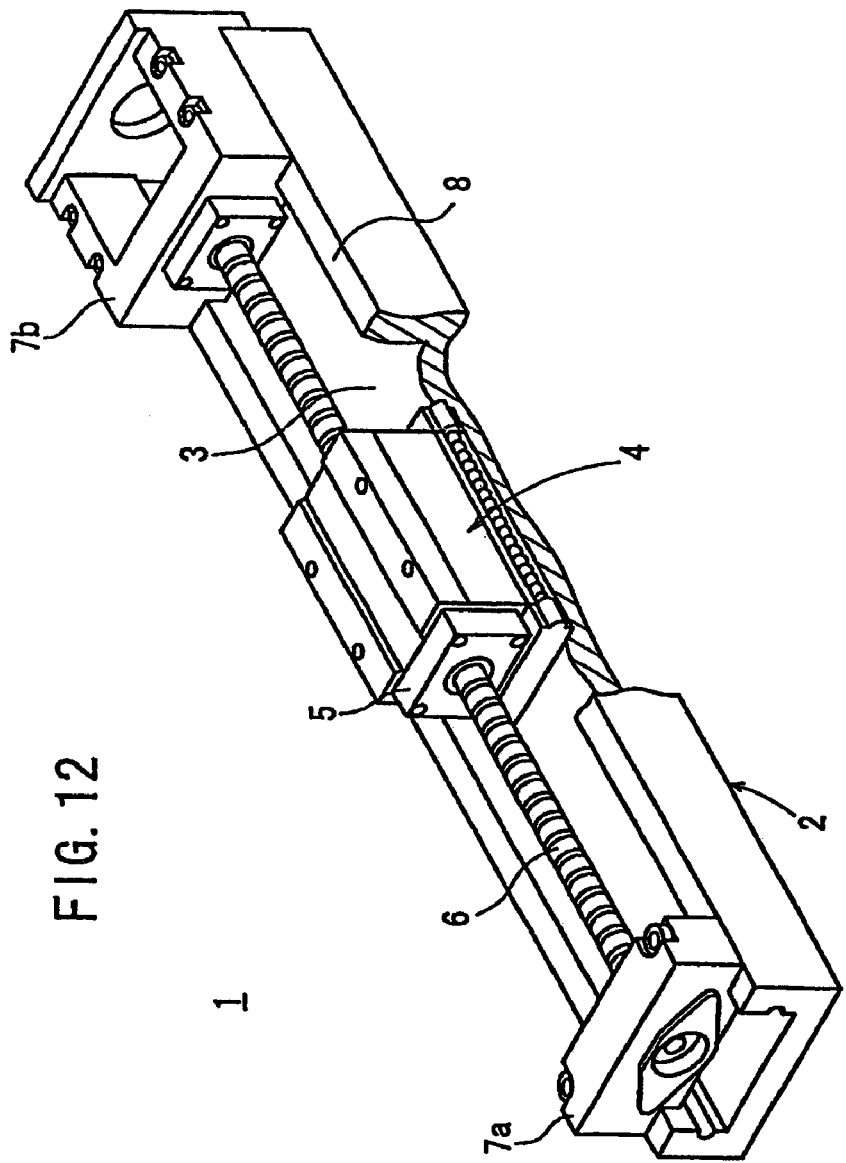
FIG. 12 is a partly cutaway perspective view of a prior art electric actuator.
Figure 13:
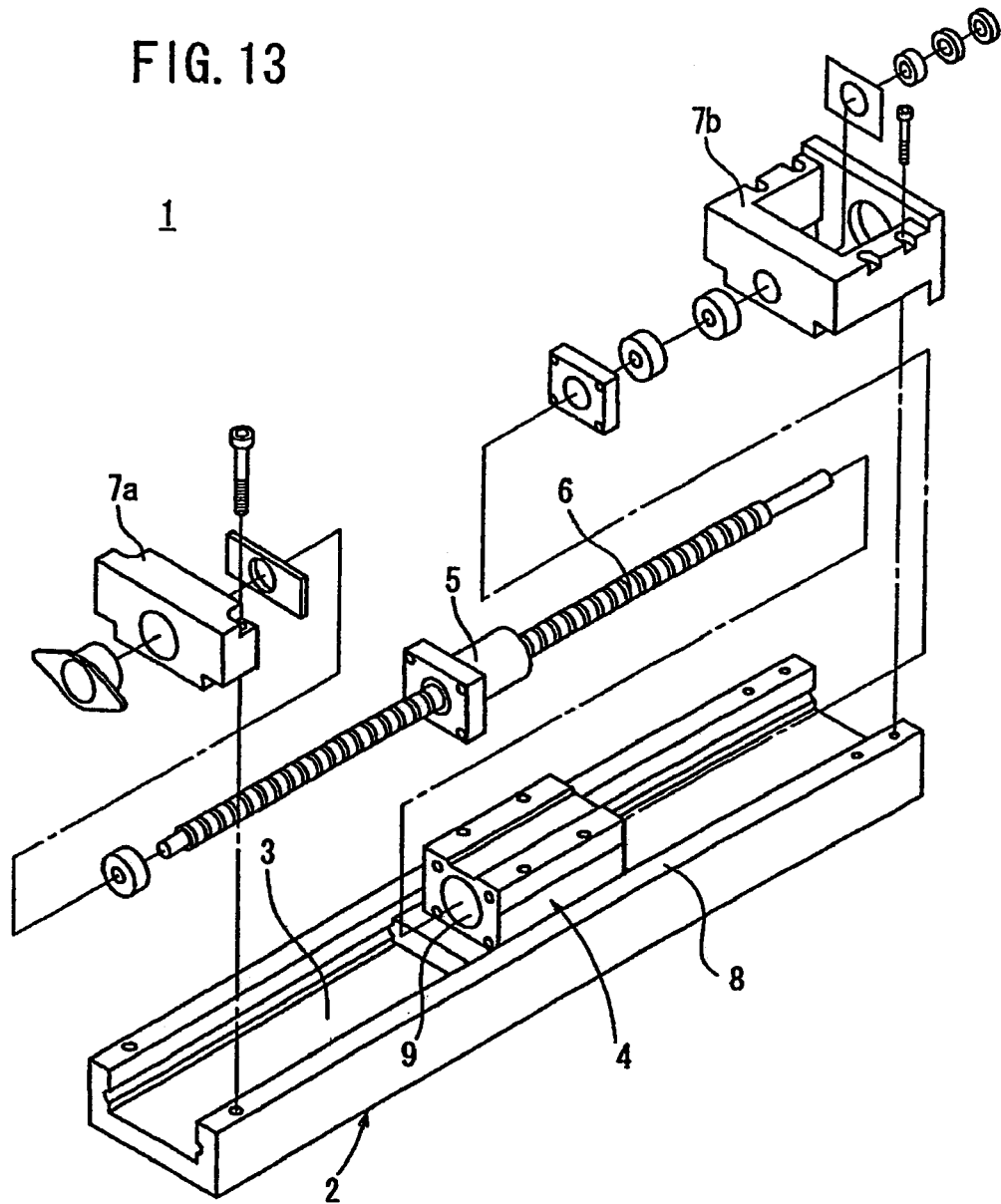
FIG. 13 is an exploded perspective view of the electric actuator shown in FIG. 12.

Two longitudinal guide plates 92a and 92b made of a resin and two magnets 94a and 94b having a sectional shape substantially resembling a circular arc are attached to the circumference of the piston 90. The two guide plates 92a and 92b slide along flat guide surfaces 96a and 96b formed in the inside surface of the tube 86, respectively. The two guide plats 92a and 92b guide the piston 90 for axial movement and restrain the piston 90 from turning in the tube 86. A predetermined clearance 98 is formed between the outer surface of the piston 90 excluding parts provided with the guide plates 92a and 92b, and the inside surface of the tube 86 as shown in FIG. 11.

A sliding nut 52 is the same in shape as the sliding nut 52 of the first embodiment. The sliding nut 52, similarly to the sliding nut 52 of the first embodiment, is held inside the piston 90 by a connecting member 100 attached to the front end of the piston 90 and a C clip 102 attached to the back end of the piston 90.

A sensor, such as a proximity sensor or a photmicro sensor, is fastened to a predetermined part of the circumference of the tube 86 with a band, not shown. A magnetic field created by the magnets 94a and 94b is detected by the sensor, not shown, fastened to the tube 86 to determine the position of the piston 90.

The electric actuator 80 is provided with two piston dampers 56a and 56b and end dampers 36a and 36b, the functions of which are the same as those of the piston dampers 56a and 56b and end dampers 36a and 36b of the electric actuator 10 and hence the description thereof will be omitted.

Although the invention has been described as applied to the rod type electric actuator provided with the axially movable piston rod 24, naturally, the present invention is applicable to a slide table type electric actuator provided with a slide table, not shown, connected to a piston corresponding to the piston 22.

The rod type electric actuator can be altered into a slide table type electric actuator by disconnecting the piston rod 24 from the piston 22, and replacing the rod cover 16 provided with the central hole through which the piston rod 24 is extended with a rod cover not provided with any central hole.

We claim:

1. An electric actuator, comprising:
a rotative driver;
a housing coupled with the rotative driver;
a rod cover;
a moving unit that moves along a reciprocating path by a motion-converting mechanism between the housing and the rod cover;
a tubular piston rod coupled with the moving unit that includes a plug for coupling with a work piece;
the housing includes a first end damper that is comprised of elastic material for absorbing and impeding transient conditions of the moving unit that result from sudden applied forces that change in direction and magnitude a motion of the moving unit at a first end of the motion-converting mechanism, with the first end damper having a first end damper through hole;
the motion-converting mechanism converts a rotating motion of the rotative driver into a linear motion of the moving unit;
the motion-converting mechanism includes:
a feed screw for transmitting a rotative driving force of the rotative driver to the moving unit, the feed screw extending through the first end damper through hole;
the moving unit includes:
a piston;
a sliding nut coupled with the piston;
two annular piston dampers coupled with the sliding nut;
connecting member, and an annular member;
the piston is comprised of an axial through hole, with the through hole having a substantially elliptical cross-section;
the sliding nut is substantially cylindrical and is axially inserted in the through hole of the piston and includes a threaded hole that engages the feed screw, and further includes two flat outer surfaces to restrain the sliding nut from rotating relative to the piston;
the two annular piston dampers are fitted in annular recesses that are formed in axially opposite ends of the sliding nut;
the two annular piston dampers have axial lengths that are slightly longer than a length of the annular recesses, and have a substantially elliptical cross-section with substantially flat surface along a major axis and substantially circular along a minor axis of the substantially elliptical cross-section of the two annular piston dampers;
the connecting member is coupled between a front axial end of the piston and the tubular piston rod;
a first annular piston damper of the two annular piston dampers contacts with the connecting member, and a second annular piston damper of the two annular piston dampers contacts with the annular member;
the two annular piston dampers are comprised of elastic material that absorb and impede transient conditions resulting from sudden applied forces that change in direction and magnitude the motion of the moving unit along any section of the feed screw; and
the rod cover includes a second end damper that is comprised of elastic material for absorbing and impeding transient conditions of the moving unit that result from sudden applied forces that change in direction and magnitude the motion of the moving unit at a second end of the motion-converting mechanism.

2. The electric actuator according to claim 1, wherein the sliding nut is held by the connecting member attached to one of opposite ends of the piston and the annular member attached to another end of the piston.

3. The electric actuator according to claim 2, wherein the two annular piston dampers have projecting parts of a predetermined length projecting from the opposite end surfaces of the sliding nut, respectively, the projecting part of one of the annular piston dampers is in contact with the connecting member, and the projecting part of the other annular piston damper is in contact with the annular member.

* * * * *